3,336,199
TABLET COMPOSITION
Morris E. Stolar, Parsippany, and Fred C. Ninger, Livingston, N.J., assignors to Warner-Lambert Pharmaceutical Company, Morris Plains, N.J., a corporation of Delaware
No Drawing. Filed July 3, 1963, Ser. No. 292,734
3 Claims. (Cl. 167—82)

This invention relates to improvements in antiseptic pharmaceutical compositions. More particularly, the invention relates to certain novel compositions for antiseptic tablets having prolonged antiseptic activity.

Flavored lozenges which are usually promoted as mouth fresheners having little or no antiseptic activity are well known. Oral antiseptics in liquid form having substantial antibacterial activity are equally well known but present difficulties, such as in traveling, because of the volume of liquid involved and because of the ever present danger of accidental spillage of the liquid. Attempts have been made in the past at producing flavored lozenges having the comparable effectiveness of liquid oral antiseptics but available in concentrated dry form to which only water or saliva need be added to release the antiseptic activity. Hitherto, such attempts have achieved only limited success. A basic problem involved in the production of concentrated antiseptics in the form of dry tablets has been that a high concentration of active antiseptic agents was found necessary for the tablet to be effective. Such a high concentration of active agents oftentime produces caustic side effects on buccal tissue or an unpleasant taste which greatly limits the commercial appeal of the product.

It has now been found that by combining particular antiseptic agents and preferably in further combination with certain solubilizing agents results in highly effective antiseptic tablets, lozenges, troches, or the like having prolonged antiseptic activity and great commercial appeal without having the disadvantages of unpleasant taste or caustic side effects. These highly advantageous results may be obtained by the practice of the present invention wherein smaller amounts of antiseptic agents may be employed in a tablet having an acceptable taste while maintaining a higher level of prolonged antiseptic activity than heretofore considered possible.

It is therefore an important object of this invention to provide a solubilized antiseptic composition which may be formed into tablets, lozenges, troches and the like having prolonged antiseptic activity.

It is also an object of this invention to provide an antiseptic tablet having an acceptable taste and providing substantial antiseptic activity without causing irritation of the buccal tissue.

It is a further object of this invention to provide an orally administered antiseptic tablet, lozenge, troche, and the like having prolonged antiseptic activity which persists in the buccal cavity for a substantial period of time after the tablet has been dissolved.

These and other objects are accomplished by the present invention which in its broadest aspects includes an antiseptic composition having prolonged antiseptic activity which comprises the combination of at least one antiseptic agent a solubilizing agent, a flavor blend, and compressible granules containing pharmaceutical fillers or diluents. A more specific embodiment of this invention provides compressible granules of an antiseptic composition having prolonged antiseptic activity and formed of the combination of at least one antiseptic agent, a solubilizing agent, a spray-dried flavor blend, and pharmaceutical fillers or diluents.

In the practice of preparing the novel antiseptic composition of this invention, a flavor blend composition is prepared which may be mixed directly with formed compressible granules as prepared herein, or the flavor blend may be emulsified with a binder in water and spray-dried to a dry powder. In the preferred practice the flavor blend is spray-dried to form a stable powder of flavor encased particles. This powder which may contain a principal active ingredient may then be mixed with certain other antiseptic agents a solubilizing agent, lubricants, and the like. The powder mixture is then combined with compressible granules formed from pharmaceutical fillers a solubilizing agent, and the like, from which tablets of any desirable form may be produced by procedures normally practiced in the art.

In the process of blending and tableting the compressible granules of this invention, procedures normally followed may be employed. However, a suitable procedure specifically for use herein consists of mixing the dry ingredients which include materials such as a solubilizing agent, various excipients, pharmaceutical fillers and the like with a solvent or moistening agent to form a moistened powder. The moistened powder is then passed through a coarse screen to form wet granules which are subsequently dried and passed through a series of screens to produce granular particles of substantially uniform size. These fine granules may then be mixed and thoroughly blended with the flavor blends, antiseptic agents, and a tableting lubricant. The blended granules are then permitted to fill a die of a standard tablet forming machine where they are compressed into tablet form.

The principal antiseptic agents usefully employed in combination with the compressible granules to provide the necessary antiseptic activity include materials such as bithionol, hexachlorophene, hexylresorcinol and the like. These antiseptic agents may be added either separately or in combination and in an amount from about 0.10% to about 0.80% by weight and preferably from about 0.20% to about 0.50% by weight of the formed tablet. The antiseptic agents may be combined directly with the flavor blend powder to form a single layer tablet or they may be formed as a separate layer and joined to a layer containing the flavor blend powder to form a two-layer tablet.

The solubilizing agents which are desirably included in the present antiseptic composition as necessary for the antiseptic agents to provide maximum antibacterial activity while maintaining an agreeable taste preferably include calcium phosphate tribasic and sodium phosphate dibasic. Solubilizing agents such as sodium phosphate tribasic, sodium carbonate, and the like may also be employed to enhance the effectiveness of the antiseptic activity. These agents may be added to the compressible granules either separately or in combination. Other organic and inorganic materials may also be employed provided they solubilize the antiseptic agents of the present invention in water and form a solution having a pH of about 8 to about 11 and preferably 9 to 10. Solubilizing agents forming a pH of greater than 11 when combined with the antiseptic agents in water are found to undesirably irritate the buccal tissue. Solubilizing agents forming a pH of less than about 8 are found to be unable to provide the desirable level of prolonged antibacterial activity. These solubilizing agents, when added in an amount from about 0.10% to about 0.80% by weight of the formed tablet, possess the unique characteristic of fortifying the activity of certain antiseptic agents contained in the formed tablet while maintaining an acceptable taste. Therefore, solubilizing agents which produce a tablet having an undesirable taste are necessarily excluded. Generally, equal weight amounts of the solubilizing agent are added to the weight amount of antiseptic agents present in the formed tablets.

An antiseptic composition usefully employed in the practice of the present invention in forming the spray-dried flavor blends preferably includes those which contain materials such as active antiseptics, flavoring agents and the like. The flavor blend composition usefully includes those which comprise generally, in each 100 milliliters of the composition, about 5 to about 100 milligrams of methyl salicylate, about 50 to about 100 milligrams of thymol, about 20 to about 60 milligrams of menthol and about 5 to about 150 milligrams of eucalyptol. This flavor blend composition may then be added directly to the formed granules. Preferably, this flavor blend composition is added to the compressible granules as a flavor encased spray-dried powder which may be formed by initially mixing an emulsion of the flavor blend composition with any desirable amount of water and a binder such as gum arabic, agar tragacanth, gelatin, pectin, polyvinyl pyrrolidone, methyl cellulose, and the like. The emulsion may then be spray-dried by known procedures to form dry flavored particles containing from about 10% by weight to about 40% by weight of active antiseptic agents and from about 60% by weight to about 90% by weight of binder.

The flavoring agents as used herein may include essential oils which may be added in trace amounts, or as desired, and preferably include eucalyptol although other essential oils and flavoring agents may also be employed. These essential oils may be added in addition to the oils contained in the spray-dried oral antiseptics to intensify the oils present in the dried powder formed by the spray drying operation. The essential oils may be added to the blended powders along with other additive materials such as fillers, coloring ingredients and the like.

The lubricants usefully employed herein preferably include materials such as magnesium stearate, calcium stearate, and zinc stearate although other lubricants such as sodium stearate, stearic acid, talc, mineral oil and the like may also be usefully employed. The lubricants may be blended in an amount from about 0.1% to 5.0% by weight of the dried antiseptic granules until homogeneous and then compressed in a tablet machine in accordance with the standard procedures or the lubricant may be added to the pharmaceutical fillers at any stage of the blending operation as desired.

Pharmaceutical fillers which usually constitute from about 50% to about 85% by weight of the formed compressible granules include pharmacologically inert materials which may contain various known sugars and sugar alcohols such as mannitol, sorbitol, lactose and the like. The alcohols used to form the granules include lower alkanols such as methanol, ethanol, butanol, isopropanol and the like. These alcohols are preferably anhydrous to facilitate evaporation of moisture from the powdered granules after the granules are formed.

The following examples are included in order further to illustrate the invention.

EXAMPLE 1

Placebo tablets are prepared from the following ingredients:

Base granulation:

| | | |
|---|---|---|
| Saccharin USP | gm | 0.8 |
| Sodium cyclamate | gms | 16.0 |
| Powdered sugar with 3% starch | gms | 1170.0 |
| Polyethylene glycol (M.W. 6000) | gms | 400.0 |
| Polyvinyl pyrrolidone | gms | 12.0 |
| Water | ml | 100.0 |
| Total | gms | 1698.8 |

The dry ingredients of the above base granulation are thoroughly wetted down with the liquid ingredients thereof by blending in a mixer for 10 minutes. This wetted blend is passed through a screen having 3/32 inch holes and is then dried at 50° C. for 5 hours. The dried blended base granulation is passed through a 20 mesh screen and onto a 30 mesh screen. Fines that pass through a 100 mesh screen are reprocessed. Suitable granules are recovered from the 30 mesh screen, combined with 26 grams of stearic acid and introduced into a standard tablet press wherein ½ inch circular flat-faced tablets weighing 1.5 grams each are formed.

EXAMPLE 2

Antiseptic tablets are made using the base granulation of Example 1 combined with the following ingredients without the inclusion of a stabilizing agent:

*Granulation A*

| | Parts by weight |
|---|---|
| I. Flavor blend composition: | |
| Thymol | 25 |
| Eucalyptol | 37 |
| Methyl salicylate | 21 |
| Menthol | 17 |
| Total | 100 |
| II. Antiseptic: Bithionol _____gms__ | 5 |
| III. Lubricant: Magnesium stearate ____gms__ | 4 |

A flavor blend composition containing the ingredients set forth in I above is added to a quantity of water sufficient to form an emulsion with the gum arabic which is then spray-dried to dry flavored particles containing 20% by weight of the flavor blend composition and 80% by weight gum arabic. 55 grams of this spray-dried flavor blend composition are recovered and combined with 1400 grams of the formed base granulation prepared as in Example 1. The magnesium stearate lubricant and the bithionol antiseptic are then added to these ingredients and uniformly blended in a mixer for about 15 minutes after which the granules are introduced into a standard tablet press wherein ½ inch circular flat-faced tablets weighing 1.5 grams each are formed.

EXAMPLE 3

The procedure of Example 2 is repeated with the addition of 5 grams of calcium phosphate tribasic solubilizing agent to Granulation A. Tablets from Examples 1 and 2 are tested with the presently formed tablets containing the solubilizing agent.

The duration of effectiveness of any oral antiseptic within the oral cavity may readily be determined by means of a buccal epithelial sensitivity test using the procedure of Vinson and Bennett, J. Amer. Pharm. Assoc., vol. 47, page 635 (1958). This test measures the ability of scraping taken from the oral cavity at varying time intervals after rinse with an oral antiseptic to inhibit the growth of a test organism on a seeded agar plate.

In the test twenty-five healthy subjects not under the care of a dentist were exposed to the conditions employed on the subjects in the test described by Manhold, Jr., Parker and Manhold, The New York Journal of Dentistry, vol. 32, No. 5, pages 165–171 (May 1962). Generally, the subjects' buccal samples are taken for analysis by gently scraping the inside of each cheek with a curette prior to the test, immediately after the test tablets dissolved, and at hourly intervals thereafter.

Scrapings from each subject at each time interval are transferred to the center of two sterile 7 mm. filter paper discs which are then inverted onto plates containing nutrient agar inoculated with 0.5 percent of a 24 hour culture *S. aureus* (F. & D.A. Stain No. 209). The plates are incubated overnight at 37° C. and then examined microscopically. The total number of colonies per microscope field is recorded and compared with the colony count of an adjacent area of the plate not in contact with the filter paper disc which serves as a control. The results are recorded as the percent reduction in colony count for the area covered by the paper disc compared to the count in the control area.

The tablets containing the solubilizing agent and bithionol of this example are found to have an average percentage bacterial count reduction of 48.1% up to six hours after the tablets dissolved. Tablets prepared by the procedure of Example 2 containing bithionol without the solubilizing agent are found to have an average percentage bacterial count reduction of 28.3% up to six hours after the tablets dissolved while the placebo tablets of Example 1 are found to have no significant effect in reducing the oral bacterial count.

EXAMPLE 4

The general procedure of Example 2 is repeated using the following ingredients:

*Granulation B*

I. Flavor blend composition:

| | Parts by weight |
|---|---|
| Thymol | 25 |
| Eucalyptol | 37 |
| Methyl salicylate | 21 |
| Menthol | 17 |
| Total | 100 |

II. Antiseptic agent: Hexachlorophene _____ gms__ 5.0
III. Solubilizing agent: Sodium phosphate dibasic _____ gms__ 5.0
IV. Lubricant: Magnesium stearate _____ gms__ 3.5

The single layer tablets formed are tested in vivo as in Example 3 with the placebo tablets of Example 1. The prolonged antiseptic tablets of Granulation B are found to have an average percentage bacterial count reduction of 63% up to six hours after the tablets dissolved while the placebo tablets of Example 1 are found to have no significant effect in reducing the oral bacterial count.

EXAMPLE 5

The general procedure of Example 2 is repeated using the following ingredients:

*Granulation C*

I. Flavor blend composition:

| | Parts by weight |
|---|---|
| Thymol | 25 |
| Eucalyptol | 37 |
| Methyl salicylate | 21 |
| Menthol | 17 |
| Total | 100 |

II. Antiseptic agents:
  Hexachlorophene _____ gms__ 2.5
  Hexylresorcinol _____ gms__ 2.5

*Granulation C—continued*

III. Solubilizing agent: Calcium phosphate tribasic _____ gms__ 5.0
IV. Lubricant: Stearic acid _____ gms__ 4.0

The formed single layer prolonged antiseptic tablets are tested in vivo as in Example 3 with the placebo tablets of Example 1. The prolonged antiseptic tablets having Granulation C are found to have an average percentage bacterial count reduction of 88% up to six hours after the tablets dissolved while the average percentage bacterial count reduction of the placebo tablets of Example 1 is 4% up to six hours after the tablets dissolved.

If desired, other additives such as fillers, stabilizers, coloring ingredients and the like may be combined with the ingredients previously set forth.

It is understood that the foregoing detailed description is given merely by way of illustration and that many variations may be made therein without departing from the spirit of this invention.

What is claimed is:

1. An antiseptic composition which consists essentially of the combination of about 0.1% to about 0.8% by weight of bithionol, hexachlorophene, or hexylresorcinol and about 0.1% to about 0.8% by weight of a calcium or sodium salt of phosphoric acid or sodium carbonate with an inert pharmaceutical carrier.

2. An antiseptic composition which consists essentially of the combination of about 0.1% to about 0.8% by weight of bithionol, about 0.1% to about 0.8% by weight of hexachlorophene and about 0.1% to about 0.8% by weight of a calcium or sodium salt of phosphoric acid or sodium carbonate with an inert pharmaceutical carrier.

3. A method for prolonging the antiseptic properties in the oral cavity of a composition containing about 0.1% to about 0.8% by weight of bithionol, hexachlorophene or hexylresorcinol which comprises maintaining said composition in the oral cavity and in the presence of about 0.1% to about 0.8% by weight of a calcium or sodium salt of phosphoric acid or sodium carbonate.

References Cited

UNITED STATES PATENTS

| 2,311,923 | 2/1943 | Lautmann | 167—82.7 |
| 2,380,011 | 7/1945 | Baker et al. | 167—82.7 |
| 3,134,719 | 5/1964 | Sheth et al. | 167—82 |

LEWIS GOTTS, *Primary Examiner.*

JULIAN S. LEVITT, *Examiner.*

G. A. MENTIS, S. K. ROSE, *Assistant Examiners.*